May 24, 1966 W. A. SMITH, JR 3,253,231

TRAVELING WAVE TUBE OSCILLATOR WITH TUNED CIRCUIT MEANS FOR REFLECTION AND TRANSMISSION OF SELECTED FREQUENCY SIGNALS

Filed May 1, 1963 2 Sheets-Sheet 1

INVENTOR
WILLIAM A. SMITH, JR.

BY Robert T. Dunn
AGENT

INVENTOR
WILLIAM A. SMITH, JR.
BY Robert T. Dunn
AGENT 3,253,231
Patented May 24, 1966

3,253,231

TRAVELING WAVE TUBE OSCILLATOR WITH TUNED CIRCUIT MEANS FOR REFLECTION AND TRANSMISSION OF SELECTED FREQUENCY SIGNALS

William A. Smith, Jr., Winchester, Mass., assignor to Raytheon Company, Lexington, Mass., a corporation of Delaware Filed May 1, 1963, Ser. No. 277,350
6 Claims. (Cl. 331—82)

The present invention relates to oscillator devices and more particularly to a platinotron type oscillator device in which output waves are reflected at one end of a periodic wave transmission structure providing feedback to sustain oscillations.

A platinotron oscillator sometimes called a stabilotron is described in United States Patent 3,027,521, which issued March 27, 1962, to E. J. Shelton, Jr. The device includes a periodic wave conducting structure in an envelope coextensive with a cathode surface. One end of the structure couples to a transmission line which leads to a utilization load, and the other end of the structure couples to resonant means such as a cavity and an energy absorbing load. In operation, space charge of electrons emitted from the cathode generate high frequency waves in the periodic structure, and these waves are conducted to the utilization load. A portion of the wave power reflects from the load or from an iris, travels back through the periodic structure substantially unattenuated, reflects from the tuned cavity at the other end of the structure, and proceeds back toward the load through the structure where it is amplified. Thus, positive feedback is provided in the system of sufficient magnitude to sustain the oscillations. Undesired frequencies reflected by the load or iris are not in turn reflected by the cavity but are absorbed by the absorbing load adjacent the cavity. It is one object of the present invention to provide means for improving the over-all efficiency of the stabilotron device and reduce the power of undesired frequencies transmitted to the utilization load.

It is another object to reduce the frequency pulling effect caused by variations in the impedance of the load.

It is one feature of the present invention to provide a stabilotron type device which is so tuned and coupled to a utilization load that it will transmit only a selected frequency or frequencies to the load and will reflect or attenuate all other frequencies. More particularly, a tuned circuit is coupled in series with the output transmission line and is tuned to the operating frequency of the device so that it will resonate and will transmit operating frequency only to the load and reflect other frequency signals. The tuned circuit will not reflect all of the operating frequency power generated in the periodic structure, but will reflect a sufficient fraction of this power to provide the necessary positive feedback to sustain the oscillations. Other frequencies and spurious signals will also be reflected, however, these will be absorbed by the absorbing load at the other end of the delay line.

In another embodiment of the invention, the feedback power is not reflected back through the periodic structure but is coupled through a separate transmission line to a three port circulator which couples to the input of the periodic structure. One of the ports of the circulator is coupled to an absorbing load, and the other is coupled to the input of the periodic structure. The output end of the structure couples to a three-port cavity having one port coupled to the feedback transmission line and the other port coupled to a utilization load. Thus, the system includes only one resonant structure, and that is the three-port cavity, and the frequency of this resonant structure is tuned to determine the operating frequency of the system. This permits a control of operating frequency by adjusting the tuning of only one tuned circuit; the three-port cavity at the output.

Other features and objects of the invention will be apparent from the specific description taken in conjunction with the figures in which.

Figure 1:
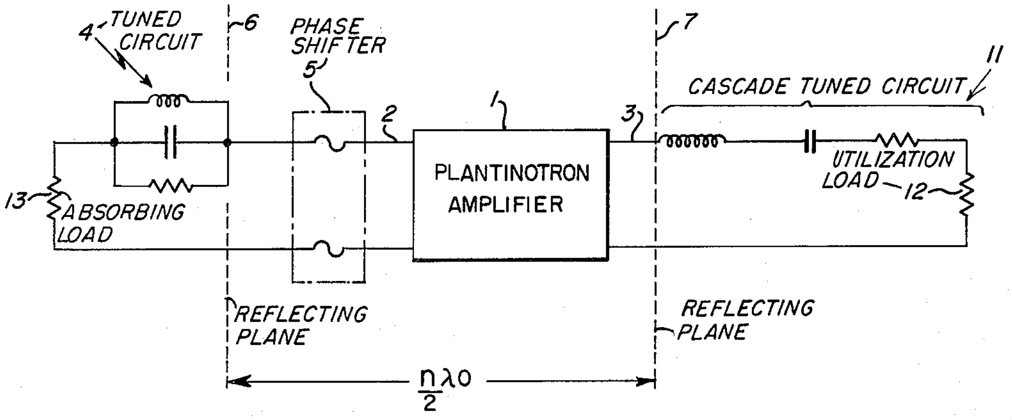
FIG. 1 is an electrical schematic of the invention illustrating the various parts in terms of electrical equivalents.

Turning first to FIG. 1 there is shown a schematic representation of the invention including a platinotron amplifier 1 which includes a delay line or periodic wave transmission structure having input and output ends 2 and 3. The input end of the periodic structure is coupled to a tuned circuit 4 by a phase shift device 5 which may be adjusted to provide an effective electrical length between the two reflecting planes 6 and 7 which is an integral number of half wavelengths of the operating frequency $f_O$. Thus, the effective electrical length between the reflecting planes 6 and 7 is $$\frac{n\lambda O}{2}$$

wherein $n$ is an integer.

The output end 3 of the structure in the amplifier 1 couples to a tuned circuit 11 which reflects part of the output power from the reflection plane 7, and thus signals reflect back and forth between the reflection planes 6 and 7 and are amplified in the platinotron amplifier 1 when they proceed from plane 6 and 7 but are substantially unaltered when they proceed from plane 7 to plane 6.

Both tuned circuits 4 and 11 are preferably tuned to the operating frequency $f_O$ of the device and circuit 4 as shown is coupled in series with the input 2 to the delay line in the amplifier, while circuit 11 is coupled in cascade with the output 3 from the delay line. Thus, the circuit 4 will reflect substantially all power at the operating frequency $f_O$, while the tuned circuit 11 will reflect only a very small portion of the power at the operating frequency $f_O$ and will transmit most of the power at the frequency $f_O$ to a useful load 12. Spurious or undesired frequencies generated in the platinotron amplifier are substantially totally reflected from plane 7 but are not reflected from plane 6, and so they are absorbed by the absorbing load 13 coupled to the circuit.

Figure 2:
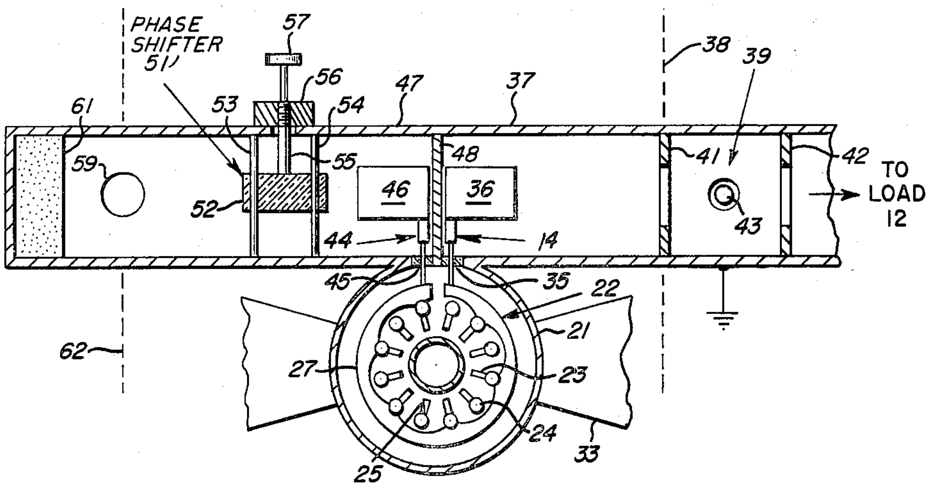
FIG. 2 is a plan-sectional view showing the amplifying portion of the stabilotron, input and output transmission lines, and tuned structures coupled to each of the transmission lines.
Figure 3:
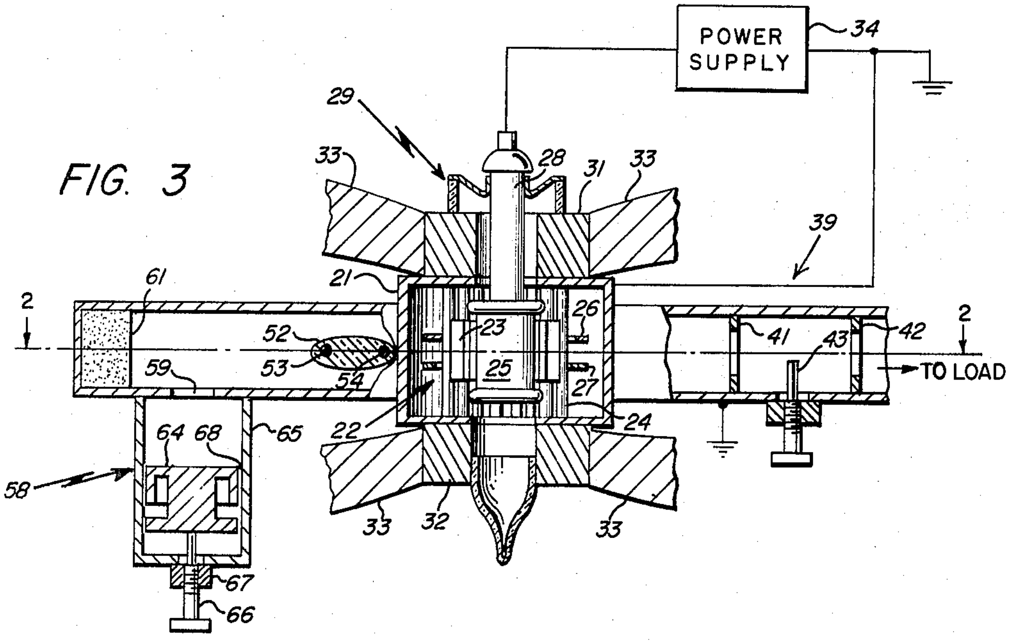
FIG. 3 is a front-sectional view of the structure shown in FIG. 2.

FIGS. 2 and 3 illustrate plan and front sectional views of an embodiment of the device having the electrical qualities described above with reference to FIG. 1. This structure includes a substantially cylindrical envelope 21 enclosing a non-reentrant periodic wave conducting structure 22 comprised of a plurality of radially disposed vanes 23 attached to tubes 24 arranged in a circle around a continuous cathode 25 formed in the shape of a cylinder. The tubes supporting alternately disposed vanes are electrically attached by straps 26 and 27. Thus, strap 26 attaches only to one group of alternately disposed tubes, while strap 27 connects only to the other group of alternately disposed tubes.

The cathode 25 is supported by a concentric stem 28 extending through the envelope wall to an insulating support 29 attached to a ring-shaped pole piece 31 which abuts the envelope. A similar ring-shaped pole piece 32 abuts the opposite wall of the envelope and both these pole pieces are contiguous with different poles of a magnet structure 33. In operation, it is preferred to ground the envelope and to apply a negative voltage to the cathode 25 from a power supply 34 producing a radial electric field bounded by the cathode and the vanes 23 which combines with the axially directed magnetic field bounded by the pole pieces 31 and 32 to compel the electron space charge to revolve around the cathode generating high frequency waves in the periodic wave conducting structure 22.

The high frequency waves of operating frequency $f_O$ generated as above are coupled from the delay line 22 by a transformer section 14 through a sealed window 35 to ramp-type ridges such as 36 in an output wave guide transmission line 37. A small fraction of the power of these waves is reflected at reflecting plane 38 at one end of a tuned cavity 39 in cascade with the transmission line 37. The cavity 39 is formed by two irises 41 and 42 disposed in the waveguide 37 a predetermined distance apart and also includes an adjustable post 43 for tuning the cavity to the operating frequency $f_O$ of the device. When tuned to the frequency $f_O$, other frequencies are substantially totally reflected at the plane 38 and are not conducted onto the utilization load 12. Thus, a portion of the output power at operating frequency $f_O$ as well as substantially the total power of spurious or undesired frequencies are reflected at the plane 38 back through the periodic structure 22.

The reflected waves are conducted through the structure substantially unattenuated and do not interact with and exchange energy with the rotating space charge of electrons because they are not synchronized with space charge waves. These reflected waves couple from the input end of the structure by a transformer section 44 through a sealed window 45 to the ramp ridges such as 46 of an input waveguide 47 which is separated from the output waveguide 37 by a septum or high frequency barrier 48.

The input waveguide 47 includes a phase shifting mechanism 51 which includes, for example, a body of dielectric material 52 supported within the waveguide on dielectric rods 53 and 54 and which is positioned along the rods by a dielectric screw 55 threadably engaging a nut 56 attached to the outer walls of the guide and turned by a knob 57. The body 52 is positioned along the rods in the field of the waves conducted by the waveguide 47 and depending upon the position of this body will intercept the wave fields where they are of relatively high or low intensity, and thus cause a reltaively large or small phase shift of the waves. The shifted waves are coupled to a tuned cavity 58 through an opening 59 in the broad wall of the waveguide. Thus, the cavity is in series with the waveguide and so waves at the frequency to which the cavity is tuned, for example $f_O$, will be reflected back toward the periodic wave structure 22, whereas other frequencies and spurious signals will not be reflected and will be conducted to an absorbing load 61 and attenuated therein. The broken line 62 represents the plane of reflection of the reflected waves, and the purpose of the phase shifter 51 is to adjust the effective electrical length at the tuned frequency $f_O$ between the reflecting planes 62 and 38 so that this length is an integral number of half wavelengths $$\frac{\lambda_O}{2}$$

of the tuned frequency.

The cavity 58 is tuned by positioning a plunger 64 in the cylinder 65 which forms the walls of the cavity. A rod 66 attached to the plunger and threadably engaging a nut 67 attached to the cylinder serves to position the plunger. The plunger includes a choke section 68 so that a high frequency short is formed between the plunger 64 and the cylinder 65.

In operation the tuning of the cavities 58 and 39 and the positioning of the phase shifter 51 are preferably all accomplished with some synchronism with respect to each other. For example, the two cavities are preferably both tuned to the same frequency and the phase shifter is positioned to provide an effective electrical length between reflecting planes which is an integral number of half wavelengths of the tuned frequency. When this is accomplished optimal operation is achieved.

Figure 4:
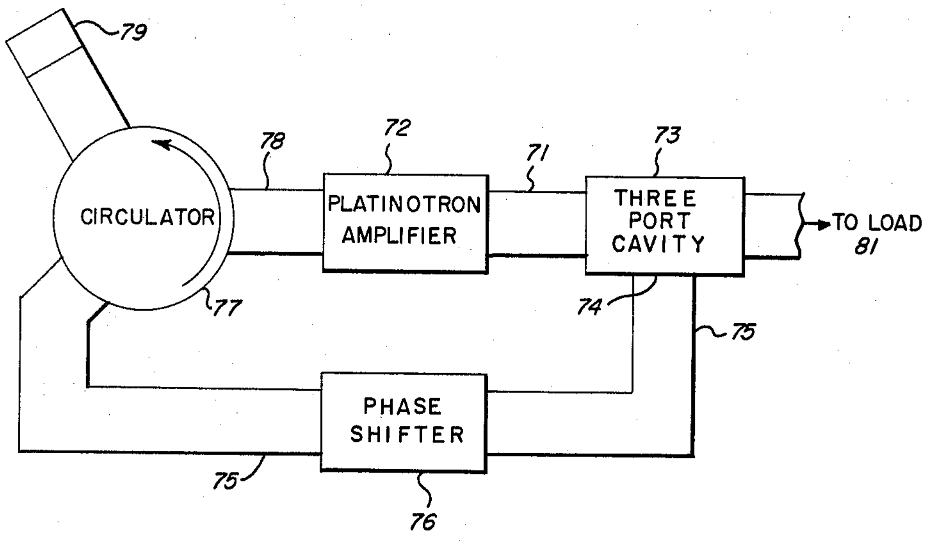
FIG. 4 is a block diagram to illustrate the embodiment of the invention including a separate feedback transmission line and a single tuned circuit at the output.

FIGURE 4 illustrates another embodiment to the invention whereby only one cavity need be adjusted to achieve optimal performance. FIGURE 4 is a simple block diagram but adequately represents the embodiment. As shown, the output 71 of the platinotron amplifier 72 couples to one port of a three port cavity 73. Another port 74 of the three port cavity couples to a feedback transmission line 75 which includes a phase shifter 76 and which couples to one of the ports of the three port circulator 77. Another port of the circulator 77 couples to the input 78 of the amplifier while the third port of the circulator couples to an absorbing load 79. This arrangement is such that the insertion loss from the feedback transmission line to the input of the amplifier is very low and insertion loss from the input of the amplifier to the absorbing load is also low whereas insertion losses in opposite directions through the circulator are very high. By this arrangement, signals reflected from the input of the amplifier or signals conducted through the amplifier from the output toward the input are absorbed by the load 79.

The third port of the three port cavity couples to a utilization load 81 and the relative amount of power coupled out of this port compared to the power coupled from the second mentioned port through the feedback transmission line is very high and is determined by the relative size and positions of these two ports in the cavity. In operation, the device is tuned by adjusting the resonant frequency of the three port cavity 73 and by adjusting the phase shifter 76 so that the phase of the feedback signal at the tuned frequency coincides with the phase of waves at the same frequency generated in the amplifier and conducted toward the output 71.

This completes descriptions of a few embodiments of the present invention which include a platinotron device in which the output end of the non-reentrant periodic wave conducting structure is coupled to a tuned circuit which reflects substantially all power at undesired or spurious frequencies but transmits substantially all the power at a desired operating frequency to a utilization load. One specific embodiment described by way of example also includes a tuned circuit at the input end of the periodic structure which also reflects feedback power at only the operating frequency back through the structure for amplification and another embodiment includes a separate feedback transmission line and a wave directing means at the input end of the delay line for accomplishing substantially the same over-all effect. These embodiments, however, are described only by way of example and do not limit the spirit and scope of the invention as set forth in the accompanying claims.

What is claimed is:

1. A high frequency signal generating device comprising:

a non-reentrant slow wave conducting structure adjacent an interaction space;

means for producing and injecting electrons into said interaction space;

transverse electrical and magnetic field producing means compelling said electrons to move through said interaction space generating said high frequency waves in said structure;

an output transmission means coupled to one end of said structure;

an input transmission means coupled to the other end of said structure;

and tuned circuit means coupled to each of said transmission lines, each serving to reflect selected frequency signals which are generated in said structure back through said structure.

2. A high frequency signal generating device comprising:
- a non-reentrant slow wave conducting structure;
- an output transmission line coupled to one end of said structure;
- an input transmission line coupled to the other end of said structure;
- selective tuned circuit means coupled to said output transmission line for transmitting only the signals at a selected resonant frequency to a utilization load and reflecting all other signals back through said wave conducting structure to said input transmission line;
- and means coupled to said input transmission line for reflecting signals at a selected resonant frequency back toward said wave conducting structure and for attenuating all signals at other frequencies.

3. A high frequency signal generating device comprising:
- a non-reentrant slow wave conducting structure;
- an output transmission line coupled to one end of said structure;
- an input transmission line coupled to the other end of said structure;
- a cavity resonator coupled to said input transmission line tuned to a selected operating frequency and serving to reflect signals at said frequency;
- signal attenuating means coupled to said input transmission line for absorbing signals at frequencies other than said selected operating frequency;
- and selective tuned circuit means coupled to said output transmission line for transmitting all signals generated by said device at said selected operating frequency to a utilization load and for reflecting all other signals back through said wave conducting structure to said input transmission line.

4. A high frequency signal generating device comprising:
- a non-reentrant slow wave conducting structure;
- an output transmission line coupled to one end of said structure;
- an input transmission line coupled to the other end of said structure;
- a cavity resonator coupled to said input transmission line tuned to a selected operating frequency and serving to reflect signals at said frequency;
- signal attenuating means coupled to said input transmission line for absorbing signals at frequencies other than said selected frequency;
- and a tunable cavity resonator coupled to said output transmission line for transmitting a substantial portion of the power generated by said device at said given frequency to a utilization load and for reflecting a relatively small amount of power at frequencies other than said selected frequency back through said wave conducting structure to said attenuating means.

5. A high frequency signal generating device comprising:
- a non-reentrant slow wave conducting structure;
- an output transmission line coupled to one end of said structure;
- an input transmission line coupled to the other end of said structure;
- a parallel resonant cavity resonator coupled in series to said input transmission line tuned to a selected operating frequency;
- signal attenuating means coupled to said input transmission line for absorbing all signals other than the selected frequency;
- and a cascade resonant cavity resonator coupled in series to said output transmission line for transmitting all signals generated by said device at said selected frequency to a utilization load and reflecting signals at all other frequencies back through said structure to said attenuating means.

6. A high frequency signal generating device comprising:
- a non-reentrant slow wave conducting structure;
- an output transmission line comprising a section of rectangular waveguide having broad and narrow walls coupled to one end of said structure;
- an input transmission line comprising a rectangular waveguide section having broad and narrow walls coupled to the other end of said structure;
- a parallel resonant cavity resonator coupled to a broad wall of said input transmission line and tuned to a selected operating frequency;
- signal attenuating means coupled to said input transmission line for absorbing all signals other than the selected frequency;
- and a cascade resonant cavity resonator comprising a plurality of resonant elements positioned in series in a portion of said output transmission line for selectively transmitting only signals generated by said device at said operating frequency to a utilization load and reflecting signals at all other frequencies back through said structure to said attenuating means.

References Cited by the Examiner

UNITED STATES PATENTS

| | | | |
|---|---|---|---|
| 2,712,605 | 8/1955 | Field | 331—82 |
| 2,724,775 | 11/1955 | Field | 331—82 |
| 2,811,641 | 10/1957 | Birdsall | 331—82 |
| 3,027,521 | 3/1962 | Shelton | 331—82 |

FOREIGN PATENTS

| | | |
|---|---|---|
| 884,841 | 12/1961 | Great Britain. |

ROY LAKE, *Primary Examiner.*

JOHN KOMINSKI, *Assistant Examiner.*